United States Patent
Ehrenberg

(10) Patent No.: US 7,414,129 B2
(45) Date of Patent: Aug. 19, 2008

(54) REACTIVE TRIPHENDIOXAZINE DYES, METHODS FOR THE PRODUCTION THEREOF, AND USE THEREOF

(75) Inventor: Stefan Ehrenberg, Hattersheim (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 11/722,906

(22) PCT Filed: Dec. 20, 2005

(86) PCT No.: PCT/EP2005/056969
§ 371 (c)(1), (2), (4) Date: Sep. 5, 2007

(87) PCT Pub. No.: WO2006/072548
PCT Pub. Date: Jul. 13, 2006

(65) Prior Publication Data
US 2008/0114166 A1    May 15, 2008

(30) Foreign Application Priority Data
Dec. 31, 2004    (DE) ................. 10 2004 063 724

(51) Int. Cl.
*C07D 498/22*    (2006.01)
(52) U.S. Cl. ........................... 544/76; 544/75; 534/635; 534/642; 8/549; 8/918
(58) Field of Classification Search .................. 544/76, 544/77
See application file for complete search history.

(56) References Cited

U.S. PATENT DOCUMENTS 5,585,489 A    12/1996    Russ et al.

FOREIGN PATENT DOCUMENTS

| EP | 0190603 A2 | 8/1986 |
|---|---|---|
| EP | 0685480 A1 | 12/1995 |
| WO | WO-99/51681 A1 | 10/1999 |

*Primary Examiner*—Kahsay T Habte
(74) *Attorney, Agent, or Firm*—Connolly Bove Lodge & Hutz LLP

(57) ABSTRACT

The present invention relates to triphendioxazine dye of the general formula I

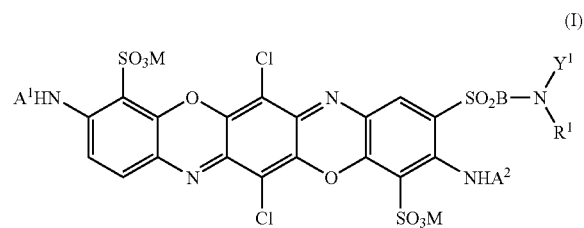

where
$A^1$ and $A^2$, B, $R^1$ and M are each as defined in the claims and
$Y^1$ is a group of the general formula II or III

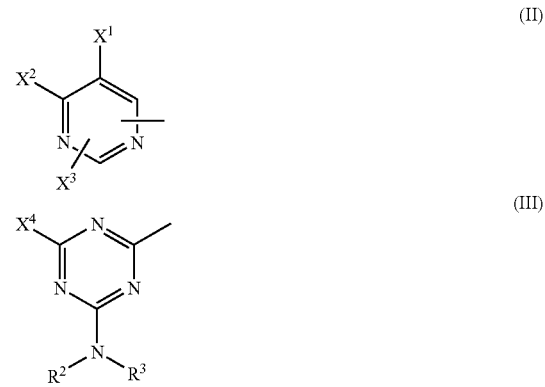

where $X^1$ to $X^4$ and also $R^2$ and $R^3$ are each as defined in the claims, processes for their preparation and their use for dyeing and printing hydroxyl- and/or carboxamido-containing materials.

9 Claims, No Drawings

REACTIVE TRIPHENDIOXAZINE DYES, METHODS FOR THE PRODUCTION THEREOF, AND USE THEREOF

RELATED APPLICATIONS

This application is a national stage application (under 35 U.S.C. 371) of PCT/EP2005/056969 filed Dec. 20, 2005, which claims benefit of German application 10 2004 063 724.5 filed Dec. 31, 2004.

The present invention relates to the field of fiber-reactive dyes and concerns dyes comprising a triphendioxazine structure.

WO 99/51681 already discloses triphendioxazine dyes containing reactive hooks. But they have a number of technical disadvantages when used for dyeing textile materials.

It is an object of the present to provide dyes having improved properties.

The present invention accordingly provides triphendioxazine dyes of the general formula I

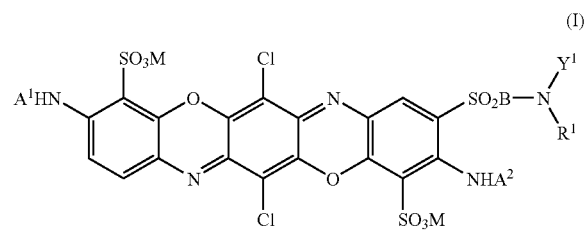

where
  $A^1$ and $A^2$ are independently hydrogen, phenyl, $(C_1-C_6)$-alkyl or substituted $(C_1-C_6)$-alkyl;
  B is phenylene, substituted phenylene, naphthylene or substituted naphthylene;
  $R^1$ is hydrogen, $(C_1-C_6)$-alkyl or phenyl;
  $Y^1$ is a group of the general formula II or III

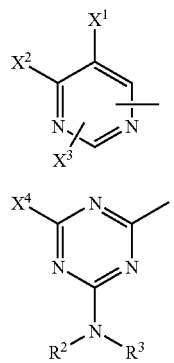

where
  $X^1$ to $X^3$ are independently hydrogen, cyano or halogen with the proviso that at least one of $X^2$ and $X^3$ is halogen;
  $X^4$ is chlorine or fluorine; and
  $R^2$ and $R^3$ are independently hydrogen, $(C_1-C_6)$-alkyl, $(C_3-C_8)$-cycloalkyl, $(C_1-C_6)$-alkyl with hydroxyl, —$SO_3M$, —$SO_2Z$, —$OSO_3M$, —COOM, cyano, $(C_1-C_6)$-alkoxy, $ZSO_2-(C_1-C_6)$-alkoxy or phenyl substitution, phenyl, phenyl substituted by one, two or three substituents selected from $(C_1-C_6)$-alkyl, $(C_1-C_6)$-alkoxy, $(C_1-C_6)$-alkoxy-$(C_1-C_6)$-alkoxy, hydroxy-$(C_1-C_6)$-alkoxy, halogen, —$SO_3M$, —$CH_2SO_3M$, —$SO_2Z$, —$SO_2NR^4R^5$, —$CON(R_6)$—$(CH_2)_{2-3}$—$SO_2Z$ or —$NHCOX^5$, or
  $R^2$ and $R^3$ combine with the interadjacent nitrogen atom to form a five- or six-membered saturated ring which contains one or two groups —O— or —$NR^7$—, where $R^7$ is hydrogen or $(C_1-C_6)$-alkyl, where
  M is hydrogen, ammonium, an alkali metal or the equivalent of an alkaline earth metal;
  $R^4$ and $R^5$ are independently hydrogen, $(C_1-C_6)$-alkyl or hydroxy-$(C_1-C_6)$-alkyl;
  $R^6$ is hydrogen, $(C_1-C_6)$-alkyl or phenyl;
  Z is —$CH=CH_2$ or —$CH_2CH_2Y^2$, where $Y^2$ is an alkali-eliminable grouping; and
  $X^5$ is —CH(Hal)—$CH_2$—Hal or —CH(Hal)=$CH_2$, where Hal is chlorine or bromine.

$(C_1-C_6)$-Alkyl groups may be straight-chain or branched and may be for example methyl, ethyl, n-propyl, i-propyl, sec-propyl, n-butyl, sec-butyl. i-butyl, tert-butyl, n-pentyl or n-hexyl. The same applies to $(C_1-C_6)$-alkoxy groups, which can thus be methoxy or ethoxy for example.

$(C_3-C_8)$-Cycloalkyl is preferably cyclopentyl and cyclohexyl, but can also be cyclobutyl or cycloheptyl.

Halogen may be for example fluorine, chlorine or bromine.

An M alkali metal is in particular lithium, sodium and potassium, whereas an alkaline earth metal whose equivalent can take the place of M can be calcium in particular. M is in particular hydrogen, lithium, sodium and potassium, of which hydrogen and sodium are particularly preferred.

A $Y^2$ alkali-eliminable grouping is for example chlorine, —$OSO_3M$, —$S_2O_3M$, —$OPO_3M_2$ and $(C_2-C_5)$-alkanoyloxy, such as acetyloxy for example, and sulfobenzoyloxy.

Sulfato is a preferred meaning of $Y^2$. Z is accordingly preferably —$CH_2CH_2OSO_3M$ and also —$CH=CH_2$.

Alkyl $A^1$ or $A^2$ is for example hydroxyl, amino or sulfato substituted and is preferably hydroxyethyl, sulfatoethyl or aminoethyl.

$A^1$ and $A^2$ preferably have the same meaning and more preferably are both hydrogen.

Substituents of B phenylene and naphthylene groups are for example $(C_1-C_6)$-alkyl, such as in particular methyl, ethyl, propyl and butyl, and halogen, such as in particular chlorine.

B is preferably 1,4-phenylene, 1,3-phenylene, 2,6-naphthylene or 2,7-naphthylene.

$R^1$ is preferably hydrogen, methyl, ethyl or phenyl, of which hydrogen and methyl are particularly preferred.

In particularly preferred triphendioxazine dyes of the general formula I
  $A^1$ and $A^2$ are each hydrogen;
  B is 1,4-phenylene, 1,3-phenylene, 2,6-naphthylene or 2,7-naphthylene; and
  $R^1$ is hydrogen, methyl, ethyl or phenyl.

Triphendioxazine dyes of the general formula I according to the present invention in each of which $Y^1$ is a group of the general formula II can be present in mixtures with one another in which the individual dyes differ in particular only in the reactive group of the general formula II. Preferred mixtures of this kind comprise for example a reactive dye in which $Y^1$ is a group of the formula IIa

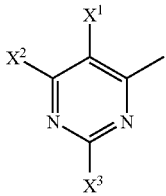
(IIa)

and a reactive dye in which $Y^1$ is a group of the formula IIb

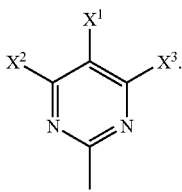
(IIb)

$X^1$ to $X^3$ are each preferably cyano, fluorine or chlorine. Particularly preferred groups of the formula II have the structures IIc to IIf

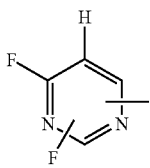
(IIc)

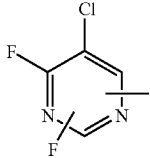
(IId)

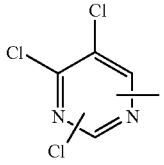
(IIe)

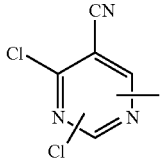
(IIf)

In triphendioxazine dyes of the general formula I according to the present invention in each of which $Y^1$ is a group of the general formula III, the —$NR^2R^3$ structure is preferably derived from the following $HNR^2R^3$ amines:

ammonia, methylamine, ethylamine, n-propylamine, isopropylamine, n-butylamine, isobutylamine, tert-butylamine, n-pentylamine, n-hexylamine, cyclohexylamine, dimethylamine, diethylamine, di-n-propylamine, diisopropylamine, methylethylamine, ethanolamine, diethanolamine, 2-methoxyethylamine, 2-ethoxyethylamine, sulfatoethylamine, aminoacetic acid, N-methylaminoacetic acid, taurine, N-methyltaurine, methylaminomethanesulfonic acid, pyrrolidine, piperidine, 1-methylpiperazine, morpholine, benzylamine, β-phenylethylamine, N-methylbenzylamine, dibenzylamine, aniline, 1-amino-2-, -3- or -4-methylbenzene, 1-amino-3,4- or 3,5-dimethylbenzene, 1-amino-3-, -3- or -4-ethylbenzene, 1-amino-2-, -3- or -4-methoxybenzene, 1-amino-4-ethoxybenzene, 1-amino-2-, -3- or -4-(2-hydroxyethoxy)benzene, 1-amino-2-, -3- or -4-(2-methoxyethoxy)benzene, 1-amino-2-, -3- or -4-chlorobenzene, 2-, 3- or 4-aminophenylmethanesulfonic acid, 2-aminobenzenesulfonic acid, 3-aminobenzenesulfonic acid, 4-aminobenzene-sulfonic acid, 5-aminobenzene-1,3- or -1,4-disulfonic acid, 4-aminobenzene-1,2- or -1,3-disulfonic acid, 2-, 3- or 4-aminobenzenesulfonamide, N-methyl-2-, -3- or -4-aminobenzenesulfonamide, N-dimethyl-2-, -3- or -4-aminobenzenesulfonamide and N-(2-hydroxyethyl)-2-, -3- or -4-aminobenzenesulfonamide.

It is particularly preferable for $R^2$ or $R^3$ to contain a —$SO_2Z$ group, the following —$NR^2R^3$ structures IVa to IVd being particularly preferred:

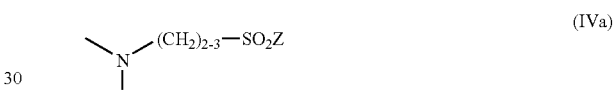
(IVa)

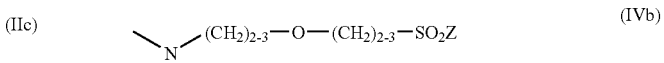
(IVb)

(IVc)

(IVd)

In the structures IVa to IVd $R^8$ is hydrogen, ($C_1$-$C_4$)-alkyl, in particular methyl, or phenyl;

$R^9$, $R^{10}$ and $R^{13}$ are each hydrogen, ($C_1$-$C_4$)-alkyl, in particular methyl and ethyl, or ($C_1$-$C_4$)-alkyl with hydroxyl, —$SO_3M$, —$OSO_3M$, —COOM or cyano substitution, in particular hydroxyethyl, sulfoethyl or sulfatoethyl;

$R^{11}$ and $R^{12}$ are independently hydrogen, ($C_1$-$C_4$)-alkyl, in particular methyl, ($C_1$-$C_4$)-alkoxy, in particular methoxy, halogen, in particular chlorine, or —$SO_3M$;

$R^{14}$ is hydrogen or —$SO_3M$;

$R^{15}$ is hydrogen, ($C_1$-$C_4$)-alkyl or phenyl;

Z is —$CH_2CH_2OSO_3M$ or —$CH=CH_2$; and

M is hydrogen, sodium or potassium.

A further particularly preferred structure for —$NR^2R^3$ is the structure of the formula IVe

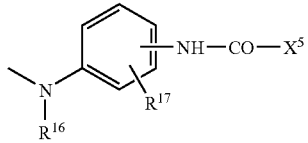

where
- $R^{16}$ is hydrogen, $(C_1$-$C_4)$-alkyl or $(C_1$-$C_4)$-alkyl with hydroxyl, —$SO_3M$, —$OSO_3M$, —$COOM$ or cyano substitution;
- $R^{17}$ is hydrogen or —$SO_3M$;
- $X^5$ is as defined above; and
- M is hydrogen, sodium or potassium.

Particularly preferred groups of the general formula III have the structures IIIa to IIIc

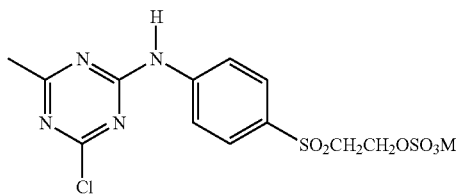

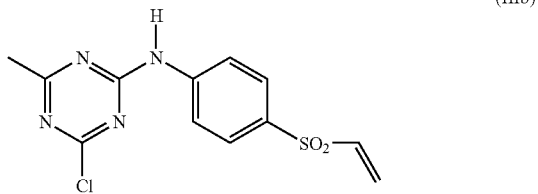

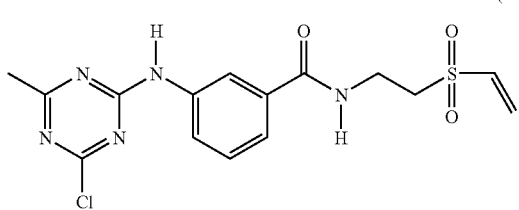

where M is as defined above.

Triphendioxazine dyes of the general formula I according to the present invention which each contain an —$SO_2Z$ radical can have the same structure except for a difference with regard to the fiber-reactive group —$SO_2Z$. In particular, with the structure being otherwise the same, —$SO_2Z$ can be —$SO_2CH$=$CH_2$ on the one hand and on the other —$SO_2CH_2CH_2Z$, more preferably β-sulfatoethylsulfonyl. The fraction of dye in the vinylsulfonyl form can be up to about 95 mol %, based on the particular dye chromophore. Preferably, the fraction of vinylsulfonyl dye to β-ethyl-substituted dye is in a molar ratio between 5:95 and 95:5.

The triphendioxazine dyes of the general formula I according to the present invention are generally present as a dye preparation in solid, dissolved or finely dispersed form. In solid form they generally include the electrolyte salts which are customary for water-soluble and, in particular, fiber-reactive dyes, such as sodium chloride, potassium chloride and sodium sulfate, and may further include the auxiliaries customary in commercial dyes, such as buffer substances capable of setting a pH between 3 and 7 in aqueous solution, such as sodium acetate, sodium borate, sodium bicarbonate, sodium dihydrogenphosphate, sodium tricitrate and disodium hydrogenphosphate, small amounts of siccatives or, if they are present in liquid, aqueous solution (including a content of thickeners of the type customary in print pastes), they also include substances which ensure a long life for these preparations, examples being mold preventatives.

For example, the triphendioxazine dyes of the general formula I according to the present invention are present as a dye powder or as a dye granulate including 10% to 80% by weight, based on the dye powder or granulate, of an electrolyte salt which is also referred to as a standardizing agent. Granulates have particle sizes from 50 to 500 m in particular. These solid preparations may also include the aforementioned buffer substances in a total amount of up to 10% by weight, based on the preparation. When the triphendioxazine dyes of the general formula I according to the present invention are present in an aqueous solution, the total dye content in these aqueous solutions is up to about 50% by weight, for example 5% and 50% by weight, the electrolyte salt content of these aqueous solutions preferably being below 10% by weight, based on the aqueous solution. The aqueous solutions (liquid preparations) may include the aforementioned buffer substances in an amount which is generally up to 10% by weight, for example in the range from 0.1% to 10% by weight. Up to 2% by weight is preferred, for example in the range from 0.1% to 2% by weight.

Preferred preparations of the triphendioxazine dyes of the general formula I according to the present invention are producible for example by grinding a triphendioxazine dye of the general formula I in the presence of water in suitable mills and, if a pulverulent preparation is to be produced, then removing the liquid.

Examples of suitable mills are ball, swing, bead or sand mills. In them the triphendioxazine dye, preferably in the form of an aqueous dye presscake, is ground in the presence of suitable auxiliaries known to one skilled in the art, to a particle size in the range from 0.5 to 5 μm. Preference is given to a particle size distribution where 50% to 90% of the particles are <1 μm in size.

It may possibly be advantageous for triphendioxazine dye, auxiliary/auxiliaries and water to be premixed in a stirred tank or beater trough or precomminuted in a colloid mill.

The grinding operation may be carried out continuously in a mill battery or else batchwise in a single grinding apparatus. The grinding operation is preferably carried out at 0 to 100° C. and more preferably at 20 to 40° C.

To produce a pulverulent preparation, the liquid preparation thus obtained has to have the liquid removed from it. This can be accomplished by vacuum drying, freeze drying, by drying on drum dryers, but preferably by spray drying. Suitable assemblies for spray drying are vacuum paddle dryers or preferably atomization dryers. The millbase may be atomized using two-material nozzles, pressure nozzles or disks.

It may possibly be advantageous to add further nonionic dispersants to improve dispersion stability and in particular the storage stability and the redispersibility of liquid and pulverulent preparations, Examples of nonionic dispersants or emulsifiers are reaction products of alkylene oxides, such as ethylene or propylene oxide for example, with alkylatable compounds, for example fatty alcohols, fatty amines, fatty acids, phenols, alkylphenols, arylalkylphenols, arylalkylarylphenols and carboxamides, for example addition products of 5 to 10 ethylene oxide units with $C_8$-$C_{10}$-alkylphenols. The fraction of these dispersants, based on the fraction of triphendioxazine dyes of the general formula I in the preparation, is preferably in the range from 2% to 35% by weight and more preferably in the range from 5% to 30% by weight.

Triphendioxazine dyes of the general formula I are preparable for example by reacting a compound of the general formula V

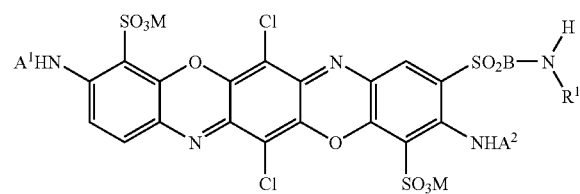

where $A^1$, $A^2$, B, $R^1$ and M are each as defined above, with a compound of the general formula VI D-Het (VI)

where

D is fluorine or chlorine and

Het is a group of the formulae II or III.

The compounds of the general formula V are known and some of them are described in WO 99/51681 for example. They are obtainable for example by reacting a compound of the general formula VII

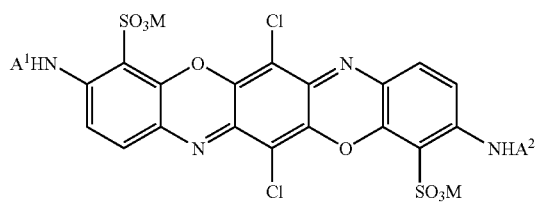

where $A^1$, $A^2$ and M are each as defined above, with a sulfinic acid of the general formula VIII

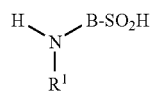

where $R^1$ and B are each as defined above, or of a salt thereof, in the presence of an oxidizing agent (see for example Berichte 28 (1895), 1315-1318).

Useful oxidizing agents include for example iron(III) salts, peroxodisulfates (persulfates), permanganates, manganese dioxide, chromic acid, peroxides, peracids, dichromates, chlorates, bromates, iodates, silver oxide, lead oxide or lead tetraacetate. Peroxodisulfates and iron(III) salts are preferred.

The compounds of the general formulae VI, VII and VIII are known and/or preparable by methods known to those skilled in the art.

Triphendioxazine dyes of the general formula I in each of which $Y^1$ is a group of the general formula III may alternatively also be prepared by reacting trifluorotriazine or trichlorotriazine with a compound of the general formula V to form the compound of the general formula IX

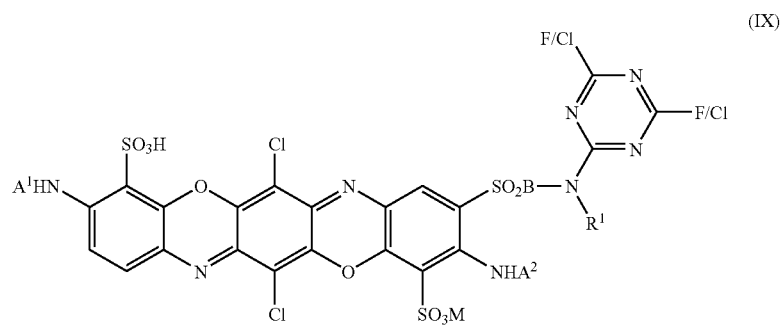

where $A^1$, $A^2$, B, $R^1$ and M are each as defined above and F/Cl is fluorine or chlorine, and further reacting the triphendioxazine dye of the general formula I with an amine $HNR^2R^3$, where $R^2$ and $R^3$ are each as defined above.

The abovementioned condensation reactions are known per se to those skilled in the art and can be carried out in the generally customary manner exhaustively described in the pertinent literature, The triphendioxazine dyes of the general formula I according to the invention are obtained as a solution or suspension in the course of the methods of preparation described above and can be isolated by salting out. They may also be spray dried; similarly, evaporation of the solution or suspension is a possibility.

The triphendioxazine dyes of the general formula I according to the invention possess useful application properties. They are used for dyeing and printing hydroxyl- and/or carboxamido-containing materials, for example in the form of sheetlike structures, such as paper and leather, or of films, as of polyamide for example, or in the mass, such as polyamide and polyurethane, for example, but especially in the form of fibers of the materials mentioned. They are preferably used for dyeing and printing cellulosic fiber materials of any kind. They are also useful for dyeing or printing hydroxyl-containing fibers present in blend fabrics, for example blends of cotton with polyester fibers or polyamide fibers. It is also possible to use them to print textiles or paper by the inkjet process.

The present invention accordingly also provides for the use of the triphendioxazine dyes of the general formula I according to the invention for dyeing or printing the materials mentioned or to be more precise processes for dyeing or printing such materials in a conventional manner utilizing one or more triphendioxazine dyes of the general formula I according to the invention as a colorant.

The materials mentioned preferably find application in the form of fiber materials, in particular in the form of textile fibers, such as wovens or yarns, as in the form of hanks or wound packages.

Hydroxyl-containing materials are those of natural or synthetic origin, examples being cellulose fiber materials or regenerated products thereof and polyvinyl alcohols. Cellulose fiber materials are preferably cotton but also include other plant fibers, such as linen, hemp, jute and ramie fibers. Examples of regenerated cellulose fibers are staple viscose and filament viscose.

Carboxamido-containing materials are for example synthetic and natural polyamides and polyurethanes, especially in the form of fibers, examples being wool and other animal hairs, silk, leather, nylon-6,6, nylon-6, nylon-11 and nylon-4.

The triphendioxazine dyes of the general formula I according to the invention can be applied to and fixed on the substrates mentioned, in particular on the fiber materials mentioned, by known techniques.

For instance, when applied by exhaust processes to cellulose fibers from long liquor using a wide variety of acid-binding agents with or without neutral salts, such as sodium chloride or sodium sulfate, they produce dyeings having very good color yields. Exhaust dyeing pH is preferably in the range from 3 to 7 and in particular in the range from 4 to 6. The liquor ratio can be chosen within wide limits and is for example between 3:1 and 50:1 and preferably between 5:1 and 30:1. Dyeing is preferably from an aqueous bath at temperatures between 40 and 105° C., if appropriate at a temperature of up to 130° C. under pressure, and in the presence or absence of customary dyeing auxiliaries. To enhance the wetfastnesses of the dyed material, unfixed dye can be removed in an aftertreatment. This aftertreatment is carried out, in particular, at a pH of 8 to 9 and temperatures of 75 to 80° C.

One possible procedure here is to introduce the material into the warm bath and to gradually heat the bath to the desired temperature and to complete the dyeing operation at that temperature. The neutral salts which hasten the exhaustion of the dyes may also be added to the bath after the actual dyeing temperature has been reached.

The acid-binding agents which effect the fixation of the dyes on the cellulose fibers include for example water-soluble basic salts of the alkali metals and likewise alkaline earth metals of inorganic or organic acids or compounds which release alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, sodium silicate or trisodium phosphate.

The triphendioxazine dyes of the general formula I according to the invention are notable for high reactivity, good fixability, very good build-up and also high light and perspiration-light fastness. They can therefore be used by the exhaust dyeing process at low dyeing temperatures and require only short steaming times in pad-steam processes. The degrees of fixation are high, and the unfixed portions are readily washed off, the difference between the degree of exhaustion and the degree of fixation being remarkably small, i.e. the hydrolysis loss being very small.

Moreover, wool which has been given a nonfelting or low-felting finish (cf. for example H. Rath, Lehrbuch der Textilchemie, Springer-Verlag, 3rd Edition (1972), p. 295-299, especially the finish by the Hercosett process (p. 298); J. Soc. Dyers and Colorists 1972, 93-99, and 1975, 33-44) can be dyed with very good fastness properties. The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzene-sulfonic acid and/or of an aminonaphthalenesulfonic acid or on the basis of a reaction product of for example stearylamine with ethylene oxide. For instance, the dyes of the invention are preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the invention and the fiber. At the same time, the dye portion not reactively bound is removed.

The procedure described herein also applies to the production of dyeings on fiber materials composed of other natural polyamides or of synthetic polyamides and polyurethanes. These materials can be dyed using the customary dyeing and printing processes described in the literature and known to one skilled in the art (see for example H.-K. Rouette, Handbuch der Textilveredlung, Deutscher Fachverlag GmbH, Frankfurt am Main).

The dyeing liquors and print pastes which comprise dissolved or finely dispersed dyes, as well as the triphendioxazine dyes of the general formula I and water, may comprise further additives. Additives are for example wetting agents, antifoam agents, leveling agents and agents which influence the properties of the textile material, such as softeners, flame retardants, soil, water and oil repellents or water-softening agents. Especially print pastes may also comprise natural or synthetic thickeners, such as for example alginates and cellulose ethers. The dye quantities can vary within wide limits in the dyebaths and print pastes depending on the desired depth of shade. The amounts of the triphendioxazine dyes of the general formula I generally range from 0.01% to 15% by weight and especially from 0.1% to 10% by weight based on the material to be dyed and the print paste respectively.

The triphendioxazine dyes of the general formula I according to the invention are notable for the fact that, following the dyeing operation, unfixed dye portions on the fiber material are readily washed off without adjacent whites in the washing operation being tainted by the dye which becomes detached. This is advantageous for the dyeing operation in that washing cycles and hence costs are saved.

The dyeings and prints produced with the triphendioxazine dyes of the general formula I according to the invention, especially on cellulose fiber materials, possess high color strength and high fiber-dye bond stability not only in the acidic but also in the alkaline range as well as good lightfastness and very good wetfastness properties, such as washing, water, seawater, crossdyeing and perspiration fastnesses, and also good fastness to dry heat setting and pleating and to crocking.

The present invention further provides for the use of the triphendioxazine dyes of the general formula I according to the invention in printing inks for digital textile printing and also said printing inks themselves. Digital textile printing shall refer in the context of the present description to the inkjet process in particular.

The printing inks of the present invention are preferably aqueous and comprise one or more of the triphendioxazine dyes of the general formula I according to the invention, for example in amounts from 0.1% by weight to 50% by weight, preferably in amounts from 1% by weight to 30% by weight and more preferably in amounts from 1% by weight to 15% by weight based on the total weight of the ink. They may also include combinations of the triphendioxazine dyes of the general formula I according to the invention with other reactive dyes used in textile printing. For the inks to be used in the continuous flow process, a conductivity of 0.5 to 25 mS/m can be set by adding an electrolyte.

Useful electrolytes include for example lithium nitrate and potassium nitrate.

The printing inks of the present invention may include organic solvents at a total level of 1-50% and preferably 5-30% by weight.

Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 2 to 8 alkylene groups, for example monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as, for example: methylamine, ethylamine, triethylamine, diethylamine, dimethylamine, trimethylamine, dibutylamine, diethanolamine, triethanolamine, N-acetylethanolamine, N-formylethanolamine, ethylenediamine, urea derivatives, such as for example: urea, thiourea, N-methylurea, N,N'-epsilon-dimethylurea, ethyleneurea, 1,1,3,3-tetramethylurea, amides, such as for example: dimethylformamide, dimethylacetamide, acetamide, ketones or keto alcohols, such as for example: acetone, diacetone alcohol, cyclic ethers, such as for example; tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolactone, trimethylpropane, 1,2-dimethoxypropane, dioxane, ethyl acetate, ethylenediaminetetraacetate, ethyl pentyl ether, 1,2-dimethoxypropane, trimethylpropane.

The printing inks of the invention may further include customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Useful viscosity moderators include rheological additives, for example:

polyvinylcaprolactam, polyvinylpyrrolidone and their copolymers polyetherpolyol, associative thickeners, polyurea, polyurethane, sodium alginates, modified galactomannans, polyetherurea, polyurethane, nonionic cellulose ethers.

As further additives the printing inks of the invention may include surface-active substances to set surface tensions of 20 to 65 mN/m, which are adapted if necessary as a function of the process used (thermal or piezo technology).

Useful surface-active substances include for example: all surfactants, preferably nonionic surfactants, butyldiglycol, 1,2-hexanediol.

The inks may further include customary additives, for example substances to inhibit fungal and bacterial growth in amounts from 0.01 to 1% by weight based on the total weight of the ink.

The inks may be prepared in a conventional manner by mixing the components in water.

The printing inks of the invention are useful in inkjet printing processes for printing a wide variety of pretreated materials, such as silk, leather, wool, polyamide fibers and polyurethanes, and especially cellulosic fiber materials of any kind. Such fiber materials are for example the natural cellulose fibers, such as cotton, linen and hemp, and also pulp and regenerated cellulose, The printing inks of the invention are also useful for printing pretreated hydroxyl- or amino-containing fibers present in blend fabrics, for example blends of cotton, silk, wool with polyester fibers or polyamide fibers.

In contrast to conventional textile printing, where the printing ink already contains all the fixing chemicals and thickeners for a reactive dye, in inkjet printing the auxiliaries have to be applied to the textile substrate in a separate pretreatment step.

The pretreatment of the textile substrate, for example cellulose and regenerated cellulose fibers and also silk and wool, is effected with an aqueous alkaline liquor prior to printing. To fix reactive dyes there is a need for alkali, for example sodium carbonate, sodium bicarbonate, sodium acetate, trisodium phosphate, sodium silicate, sodium hydroxide, alkali donors such as, for example, sodium chloroacetate, sodium formate, hydrotropic substances such as, for example, urea, reduction inhibitors, for example sodium nitrobenzene sulfonates, and also thickeners to prevent flowing of the motives when the printing ink is applied, for example sodium alginates, modified polyacrylates or highly etherified galactomannans.

These pretreatment reagents are uniformly applied to the textile substrate in a defined amount using suitable applicators, for example using a 2- or 3-roll pad, contactless spraying technologies, by means of foam application or using appropriately adapted inkjet technologies, and subsequently dried.

After printing, the textile fiber material is dried at 120 to 150° C. and subsequently fixed.

The fixing of the inkjet prints prepared with reactive dyes may be effected at room temperature or with saturated steam, with superheated steam, with hot air, with microwaves, with infrared radiation, with laser or electron beams or with other suitable energy transfer techniques.

A distinction is made between one- and two-phase fixing processes:

In one-phase fixing, the necessary fixing chemicals are already on the textile substrate.

In two-phase fixing, this pretreatment is unnecessary. Fixing only requires alkali, which, following inkjet printing, is applied prior to the fixing process, without intermediate drying. There is no need for further additives such as urea or thickener. Fixing is followed by the print aftertreatment, which is the prerequisite for good fastnesses, high brilliance and an impeccable white ground.

The prints produced with the printing inks of the present invention, especially on cellulose fiber materials, possess high color strength and high fiber-dye bond stability not only in the acidic but also in the alkaline range as well as good lightfastness and very good wetfastness properties, such as washing, water, seawater, crossdyeing and perspiration fastnesses, and also good fastness to dry heat setting and pleating and to crocking.

The examples hereinbelow serve to illustrate the invention. Parts and percentages are by weight, unless otherwise stated. Parts by weight relate to parts by volume as the kilogram relates to the liter.

The compounds described in the examples in terms of formulae are indicated in the form of free acid. But generally they are prepared and isolated in the form of their alkali metal salts, such as lithium, sodium or potassium salts, and used for dyeing in the form of their salts. Similarly, the starting compounds and components indicated in the form of free acid in the subsequent examples, especially table examples, can be used in the synthesis as such or in the form of their salts, preferably alkali metal salts.

The absorption maxima ($\lambda_{max}$) in the visible range reported for the dyes according to the invention were determined in aqueous solutions of their alkali metal salts.

EXAMPLE 1 a) 74.2 parts of a compound of the formula

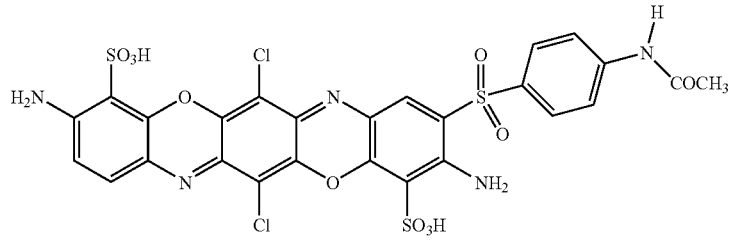

are heated to 90° C. in 1000 parts of 15% hydrochloric acid. On completion of the hydrolysis of the acetyl group, the reaction mixture is cooled down and the residue obtained is filtered off to obtain the compound of the formula Va

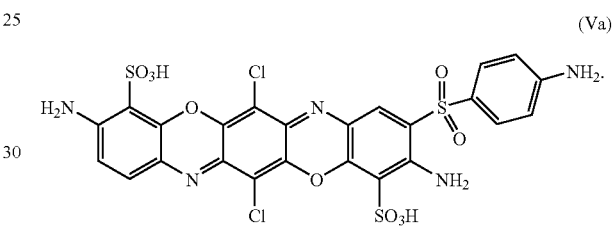

b) A solution of 14.1 parts of 4-(β-sulfatoethylsulfonyl) aniline in 100 parts of water at pH 4-4.5 is added over 30 minutes to a suspension of 9.4 parts of cyanuric chloride in 50 parts of water and 100 parts of ice. The acylation is carried out at pH 2 to give the compound of the formula VIa

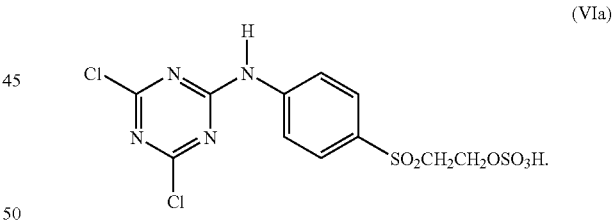

c) 32 parts of the compound of the formula Va are suspended in 500 parts of water and made to go into solution at 70° C. and pH 4-4.5. Following rapid cooling to 45-50° C., the compound of the formula VIa is added over 20 minutes. The pH is maintained at 4-4.5 with saturated NaHCO$_3$ solution. This is followed by stirring at 45-50° C.

After the reaction has ended, the reaction mixture is cooled to 15-20° C., adjusted to ph 11-11.5 with 2 N aqueous sodium hydroxide solution, maintained and subsequently stirred.

After vinylization has ended, the pH is adjusted to 6.5-7 and the suspended dye is filtered off and dried. 10 g of the dye obtained are bead milled (100 g of glass beads; diameter 0.3-0.4 mm) at 25° C. in the presence of 70 ml of water for 6 hours. The finely dispersed dye of the formula Ia

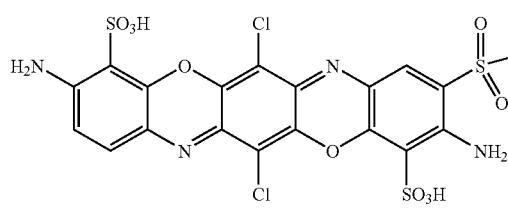

dyes nylon and wool in brilliant reddish blue shades.

EXAMPLE 2

14.0 parts of the compound of the formula Vb

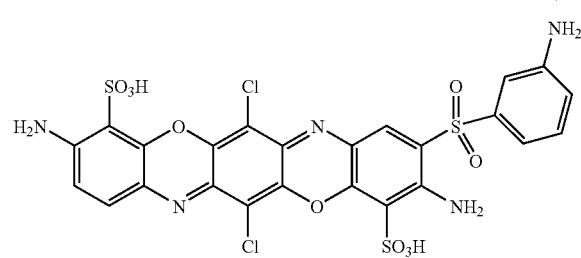

are suspended in 200 parts of water and made to go into solution at 70° C. and pH 5.0-5.5. After rapid cooling to 50° C., 4.0 parts of 2,4,6-trifluoropyrimidine are added dropwise over 30 minutes. The pH is held at 5.0-5.5 with 20% aqueous sodium carbonate solution. The mixture is subsequently stirred at 50-55° C. for 2 hours.

After the reaction has ended, the dye is precipitated by addition of sodium chloride, filtered off with suction and dried. The dye obtained has the formula Ib

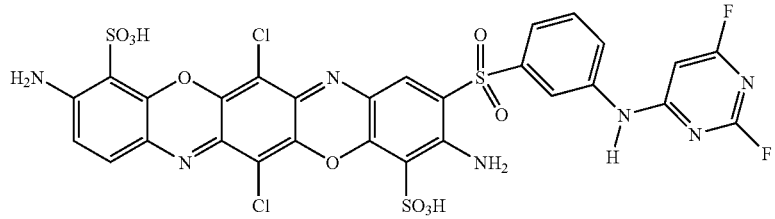

and dyes cotton in brilliant blue shades.

EXAMPLES 3 TO 13

The methods described in Examples 1 and 2 are repeated to obtain the hereinbelow indicated dyes of Examples 3 to 13

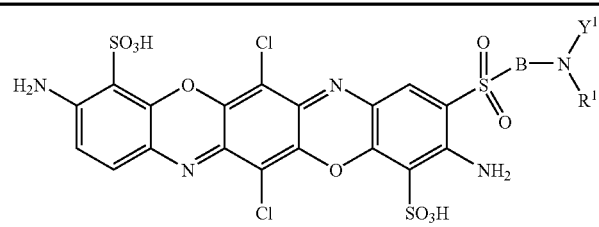

| Example | —B—N(R$^1$)— | —Y$^1$ | Hue | λ$_{max}$ |
|---|---|---|---|---|
| 3 | ![tolyl-NH] | ![triazinyl-NH-phenyl-SO2CH2CH2OSO2H] | blue | 610 |

-continued
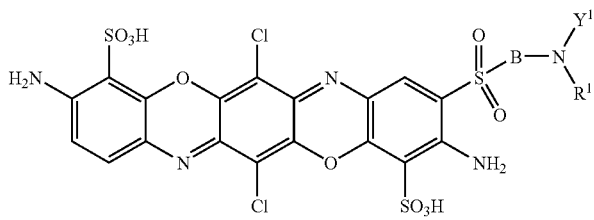
| Example | —B—N(R¹)— | —Y¹ | Hue | $\lambda_{max}$ |
|---|---|---|---|---|
| 4 |  | 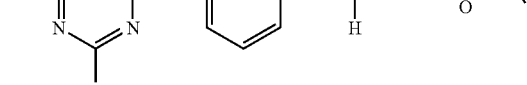 | blue | 595 |
| 5 | 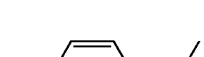 |  | blue | 600 |
| 6 | 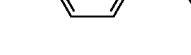 | 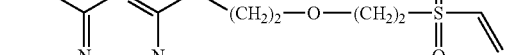 | blue | 590 |
| 7 |  |  | blue | 595 |
| 8 | 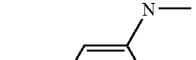 | 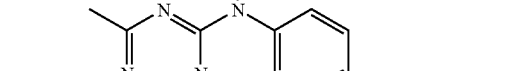 | blue | 600 |
| 9 | 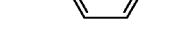 |  | blue | 598 |

-continued

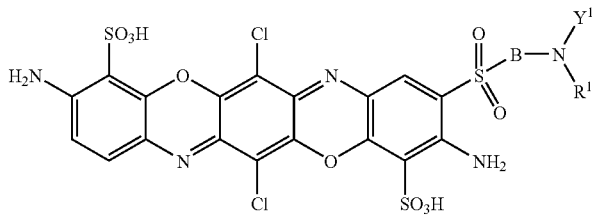

| Example | —B—N(R¹)— | —Y¹ | Hue | $\lambda_{max}$ |
|---|---|---|---|---|
| 10 | (6-methyl-2-naphthyl)-N(CH₃)– | chlorotriazinyl-NH-C₆H₄-SO₂-CH=CH₂ | blue | 615 |
| 11 | (6-methyl-2-naphthyl)-N(CH₃)– | chlorotriazinyl-N(CH₃)-CH₂CH₂-SO₃H | blue | 612 |
| 12 | (6-methyl-2-naphthyl)-N(CH₃)– | chlorotriazinyl-NH-C₆H₄-SO₂CH₂CH₂OSO₃H | blue | 610 |
| 13 | (7-methyl-2-naphthyl)-N(CH₃)– | fluorotriazinyl-NH-C₆H₃(SO₃H)₂ | blue | 618 |

Illustrative Dyeing 1

8 parts of the dye of Example 1 are dissolved in 2000 parts of water and 5 parts of sodium sulfate, 1 part of a leveling assistant (based on a condensation product of a higher aliphatic amine and ethylene oxide) and also 5 parts of sodium acetate are added.

The pH is then adjusted to 4.5 with acetic acid (80%). The dyebath is heated to 50° C. for 10 minutes, at which point 100 parts of a woven wool fabric are added. The bath is heated to a temperature of 100° C. over 50 minutes and the wool is dyed at 100° C. for 60 minutes. The bath is then allowed to cool down to 90° C., at which point the dyed wool fabric is removed, washed with warm and cold water and subsequently whizzed and dried. The blue dyeing obtained has good light and wet fastnesses and is level in the fiber.

Illustrative Dyeing 2

8 parts of the dye dispersed according to Example 1 are suspended in 2000 parts of water and 1 part of a leveling assistant (based on a condensation product of a higher aliphatic amine and ethylene oxide) and also 5 parts of sodium acetate are added.

The pH is then adjusted to 5 with acetic acid (80%). The dyebath is heated to 50° C. for 10 minutes, at which point 100 parts of a woven nylon fabric are added. The bath is heated to a temperature of 110° C. over 50 minutes and the nylon is dyed at 110° C. for 60 minutes. The bath is then allowed to cool down to 60° C., at which point the dyed nylon fabric is removed, washed with warm and cold water, soaped and subsequently whizzed and dried.

The blue dyeing obtained has good light and wet fastnesses and is level in the fiber.

Illustrative Dyeing 3

2 parts of a dye obtained according to Example 3 and 50 parts of sodium chloride are dissolved in 999 parts of water before 5 parts of sodium carbonate, 0.7 part of sodium hydroxide (in the form of a 32.5% aqueous solution) and, if appropriate, 1 part of a wetting agent are added. This dyebath is entered with 100 g of a woven cotton fabric. The temperature of the dyebath is initially held at 25° C. for 10 minutes, then raised over 30 minutes to the final temperature (40-80° C.) and held at this temperature for a further 60-90 minutes. Thereafter, the dyed fabric is rinsed, initially with tap water for 2 minutes and then with deionized water for 5 minutes. The dyed fabric is neutralized at 40° C. in 1000 parts of an aqueous solution which contains. 1 part of 50% acetic acid, for 10 minutes. The fabric is subsequently rinsed at 70° C. with deionized water and then soaped off at the boil with a laundry detergent for 15 minutes, rinsed once more and dried. The blue dyeing obtained is strong in color and has very good fastness properties.

What is claimed is:

1. A triphendioxazine dye of the formula I

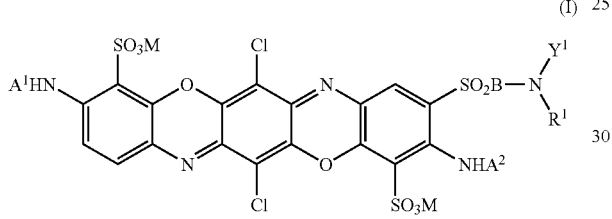
(I)

where
- $A^1$ and $A^2$ are independently hydrogen, phenyl, $(C_1-C_6)$-alkyl or substituted $(C_1-C_6)$-alkyl;
- B is phenylene, substituted phenylene, naphthylene or substituted naphthylene;
- $R^1$ is hydrogen, $(C_1-C_6)$-alkyl or phenyl;
- $Y^1$ is a group of the general formula II or III

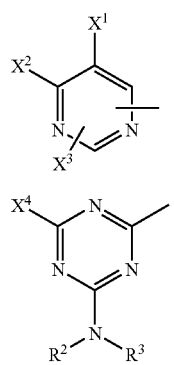
(II)

(III)

where
- $X^1$ to $X^3$ are independently hydrogen, cyano or halogen with the proviso that at least one of $X^2$ and $X^3$ is halogen;
- $X^4$ is chlorine or fluorine; and
- $R^2$ and $R^3$ are independently hydrogen, $(C_1-C_6)$-alkyl, $(C_3-C_8)$-cycloalkyl, $(C_1-C_6)$-alkyl with hydroxyl, —$SO_3M$, —$SO_2Z$, —$OSO_3M$, —COOM, cyano, $(C_1-C_6)$-alkoxy, $ZSO_2$-$(C_1-C_6)$-alkoxy or phenyl substitution, phenyl, phenyl substituted by one, two or three substituents selected from $(C_1-C_6)$-alkyl, $(C_1-C_6)$-alkoxy, $(C_1-C_6)$-alkoxy-$(C_1-C_6)$-alkoxy, hydroxy-$(C_1-C_6)$-alkoxy, halogen, —$SO_3M$, —$CH_2SO_3M$, —$SO_2Z$, —$SO_2NR^4R^5$, —$CON(R_6)$—$(CH_2)_{2-3}$—$SO_2Z$ or —$NHCOX^5$, or
- $R^2$ and $R^3$ combine with the interadjacent nitrogen atom to form a five- or six-membered saturated ring which contains one or two groups —O— or —$NR^7$—, where $R^7$ is hydrogen or $(C_1-C_6)$-alkyl, where
- M is hydrogen, ammonium, an alkali metal or the equivalent of an alkaline earth metal;
- $R^4$ and $R^5$ are independently hydrogen, $(C_1-C_6)$-alkyl or hydroxy-$(C_1-C_6)$-alkyl;
- $R^6$ is hydrogen, $(C_1-C_6)$-alkyl or phenyl;
- Z is —CH=$CH_2$ or —$CH_2CH_2Y^2$, where $Y^2$ is an alkali-eliminable grouping; and
- $X^5$ is —CH(Hal)—$CH_2$—Hal or —CH(Hal)=$CH_2$, where Hal is chlorine or bromine.

2. The triphendioxazine dye according to claim 1, wherein
$A^1$ and $A^2$ are each hydrogen;
B is 1,4-phenylene, 1,3-phenylene, 2,6-naphthylene or 2,7-naphthylene; and
$R^1$ is hydrogen, methyl, ethyl or phenyl.

3. The triphendioxazine dye according to claim 1, wherein $Y^1$ is a group of the formula IIc, IId, IIe or IIf

(IIc)

(IId)

(IIe)

(IIf)

4. The triphendioxazine dye according to claim 2, wherein $Y^1$ is a group of the formula IIc, IId, IIe or IIf

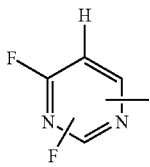
(IIc)

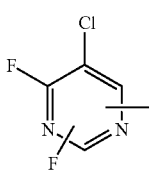
(IId)

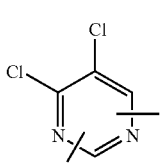
(IIe)

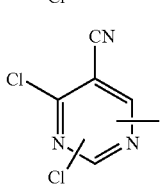
(IIf)

5. The triphendioxazine dye according to claim 1, wherein $Y^1$ is a group of the general formula III where —$NR^2R^3$ is a group of the formula IVa, IVb, IVc or IVd

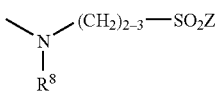
(IVa)

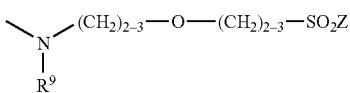
(IVb)

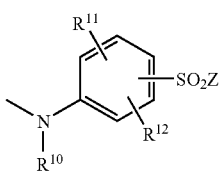
(IVc)

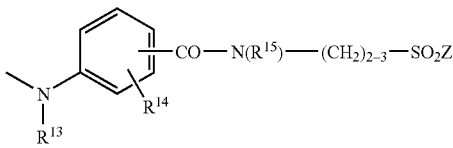
(IVd)

where $R^8$ is hydrogen, $(C_1-C_4)$-alkyl, or phenyl;

$R^9$, $R^{10}$ and $R^{13}$ are each hydrogen, $(C_1-C_4)$-alkyl, or $(C_1-C_4)$-alkyl with hydroxyl, —$SO_3M$, —$OSO_3M$, —COOM or cyano substitution, hydroxyethyl, sulfoethyl or sulfatoethyl;

$R^{11}$ and $R^{12}$ are independently hydrogen, $(C_1-C_4)$-alkyl, $(C_1-C_4)$-alkoxy, halogen, or —$SO_3M$;

$R^{14}$ is hydrogen or —$SO_3M$;

$R^{15}$ is hydrogen, $(C_1-C_4)$-alkyl or phenyl;

Z is —$CH_2CH_2OSO_3M$ or —$CH=CH_2$; and

M is hydrogen, sodium or potassium;

or —$NR^2R^3$ is a group of the formula IVe

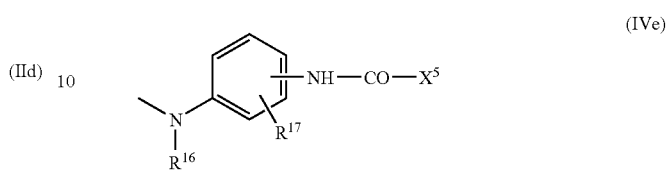
(IVe)

where $R^{16}$ is hydrogen, $(C_1-C_4)$-alkyl or $(C_1-C_4)$-alkyl with hydroxyl, —$SO_3M$, —$OSO_3M$, —COOM or cyano substitution;

$R^{17}$ is hydrogen or —$SO_3M$;

$X^5$ is —CH(Hal)—$CH_2$—Hal or —CH(Hal)=$CH_2$, where Hal is chlorine or bromine and M is hydrogen, sodium or potassium.

6. The triphendioxazine dye according to claim 4, wherein $Y^1$ is a group of the general formula III where —$NR^2R^3$ is a group of the formula IVa, IVb, IVc or IVd

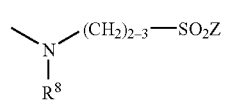
(IVa)

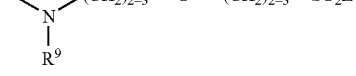
(IVb)

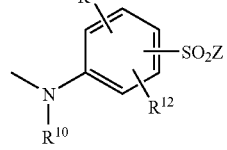
(IVc)

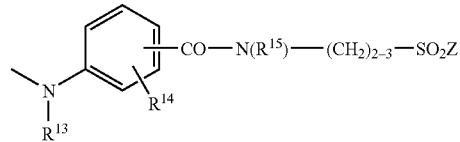
(IVd)

where $R^8$ is hydrogen, methyl or phenyl;

$R^9$, $R^{10}$ and $R^{13}$ are each hydrogen, methyl, ethyl, hydroxyethyl, sulfoethyl or sulfatoethyl;

$R^{11}$ and $R^{12}$ are independently hydrogen, methyl, methoxy, chlorine, or —$SO_3M$;

$R^{14}$ is hydrogen or —$SO_3M$;

$R^{15}$ is hydrogen, $(C_1-C_4)$-alkyl or phenyl;

Z is —$CH_2CH_2OSO_3M$ or —$CH=CH_2$; and

M is hydrogen, sodium or potassium;

or —NR²R³ is a group of the formula IVe

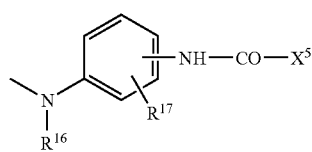

(IVe)

where
R¹⁶ is hydrogen, $(C_1-C_4)$-alkyl or $(C_1-C_4)$-alkyl with hydroxyl, —SO₃M, —OSO₃M, —COOM or cyano substitution;
R¹⁷ is hydrogen or —SO₃M;
X⁵ is —CH(Hal)—CH₂—Hal or —CH(Hal)=CH₂, where Hal is chlorine or bromine and
M is hydrogen, sodium or potassium.

7. The triphendioxazine dye according to claim 1, wherein Y¹ is a group of the general formula IIIa to IIIc

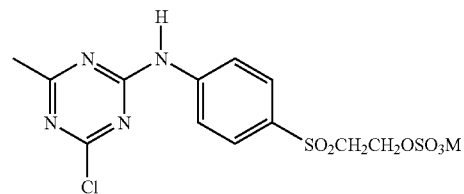

(IIIa)

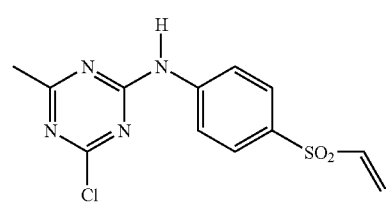

(IIIb)

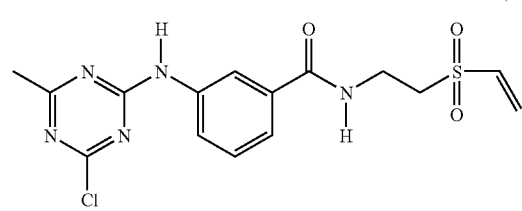

(IIIc)

where M is hydrogen, ammonium, an alkali metal or the equivalent of an alkaline earth metal.

8. A process for preparing a triphendioxazine dye according to claim 1 which comprises reacting a compound of the general formula V

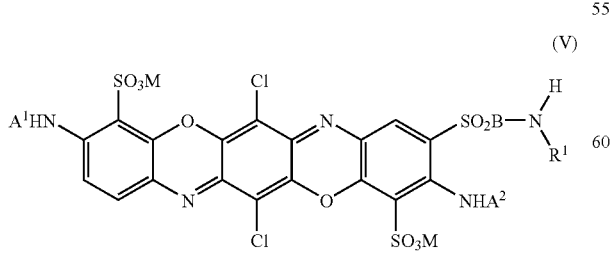

(V)

where A¹, A², B, R¹ and M are each as defined in claim 1, with a compound of the general formula VI D-Het    (VI)

where
D is fluorine or chlorine and
Het is a group of the formulae II or III.

9. The process for preparing a triphendioxazine dye according to claim 7, wherein Y¹ is a group of the general formula III, which comprises reacting trifluorotriazine or trichlorotriazine with a compound of the general formula V to form the compound of the general formula IX

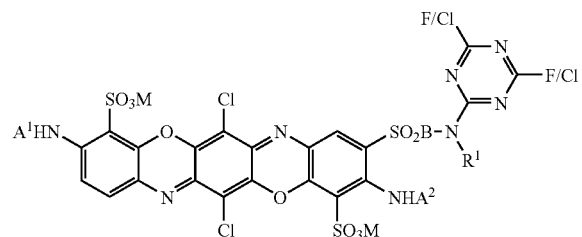

(IX)

wherein

A¹ and A² are independently hydrogen, phenyl, $(C_1-C_6)$-alkyl or substituted $(C_1-C_6)$-alkyl;

B is phenylene, substituted phenylene, naphthylene or substituted naphthylene;

R¹ is hydrogen, $(C_1-C_6)$-alkyl or phenyl; where

M is hydrogen, ammonium, an alkali metal or the equivalent of an alkaline earth metal;

and F/Cl is fluorine or chlorine, and further reacting the compound of the general formula IX with an amine HNR²R³, R² and R³ are independently hydrogen, $(C_1-C_6)$-alkyl, $(C_3-C_8)$-cycloalkyl, $(C_1-C_6)$-alkyl with hydroxyl, —SO₃M, —SO₂Z, —OSO₃M, —COOM, cyano, $(C_1-C_6)$-alkoxy, ZSO₂-$(C_1-C_6)$-alkoxy or phenyl substitution, phenyl, phenyl substituted by one, two or three substituents selected from $(C_1-C_6)$-alkyl, $(C_1-C_6)$-alkoxy, $(C_1-C_6)$-alkoxy-$(C_1-C_6)$-alkoxy, hydroxy-$(C_1-C_6)$-alkoxy, halogen, —SO₃M, —CH₂SO₃M, —SO₂Z, —SO₂NR⁴R⁵, —CON(R₆)—(CH₂)₂₋₃—SO₂Z or —NHCOX⁵, or R² and R³ combine with the interadjacent nitrogen atom to form a five- or six-membered saturated ring which contains one or two groups —O— or —NR⁷—, where R⁷ is hydrogen or $(C_1-C_6)$-alkyl.

* * * * *